(12) United States Patent
Erickson et al.

(10) Patent No.: US 10,930,034 B2
(45) Date of Patent: *Feb. 23, 2021

(54) AUTOMATED EVENT CORRELATION IN A MANAGED HISTORIAN SYSTEM

(71) Applicant: AVEVA SOFTWARE, LLC, Lake Forest, CA (US)

(72) Inventors: Brian Kenneth Erickson, Long Beach, CA (US); Sripraneeth Kumar Nara, Mission Viejo, CA (US); Ravi Kumar Herunde Prakash, Lake Forest, CA (US); Vinay T. Kamath, Rancho Santa Margarita, CA (US); Abhijit Manushree, Laguna Niguel, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,106

(22) Filed: Oct. 22, 2018

(65) Prior Publication Data

US 2020/0286269 A1 Sep. 10, 2020

Related U.S. Application Data

(63) Continuation of application No. 15/856,896, filed on Dec. 28, 2017, now Pat. No. 10,109,088.

(51) Int. Cl.
| | | |
|---|---|---|
| *G06T 11/00* | (2006.01) | |
| *G06T 11/20* | (2006.01) | |
| *G06T 11/60* | (2006.01) | |
| *G06F 16/21* | (2019.01) | |
| *G06F 16/28* | (2019.01) | |
| *G06F 16/2455* | (2019.01) | |
| *G06F 16/904* | (2019.01) | |
| *G08B 5/22* | (2006.01) | |

(52) U.S. Cl.
CPC .......... *G06T 11/206* (2013.01); *G06F 16/219* (2019.01); *G06F 16/24568* (2019.01); *G06F 16/285* (2019.01); *G06F 16/904* (2019.01); *G06T 11/60* (2013.01); *G06T 2200/24* (2013.01); *G08B 5/22* (2013.01)

(58) Field of Classification Search
None
See application file for complete search history.

(56) References Cited

U.S. PATENT DOCUMENTS

| | | | | |
|---|---|---|---|---|
| 2008/0071817 | A1* | 3/2008 | Gaurav | G06F 16/88 |
| 2008/0077632 | A1* | 3/2008 | Tysowski | H04L 67/1095 |
| 2009/0006954 | A1* | 1/2009 | Jackson | G06F 3/01 |
| | | | | 715/700 |
| 2010/0332510 | A1* | 12/2010 | Gitai | G06F 16/211 |
| | | | | 707/759 |
| 2015/0193477 | A1* | 7/2015 | Dumant | G06F 16/211 |
| | | | | 707/609 |

* cited by examiner

*Primary Examiner* — Martin Mushambo
(74) *Attorney, Agent, or Firm* — Greenberg Traurig, LLP (57) ABSTRACT

Automated correlation of process attribute value changes with events related to the changes. A managed historian utilizes a namespace property to correlate process tag values with corresponding events. The managed historian generates and provides to remote user devices a graphical user interface that includes a plot of data values of the process tag and a visual icon representing the event overlaid atop the plot of data values.

19 Claims, 7 Drawing Sheets

AUTOMATED EVENT CORRELATION IN A MANAGED HISTORIAN SYSTEM

CROSS-REFERENCE TO RELATED APPLICATION

This application is a continuation of U.S. application Ser. No. 15/856,896, filed Dec. 28, 2017, the disclosure of which is incorporated herein in its entirety for all purposes.

TECHNICAL FIELD

Aspects of the present disclosure generally relate to the fields of networked computerized industrial control, automation systems, networked computerized systems utilized to monitor, log, and display relevant manufacturing/production events and associated data, and supervisory level control and manufacturing systems. More particularly, aspects relate to systems and methods for automatically correlating process attribute value changes with events responsible for the changes.

BACKGROUND

Managed historians utilize cloud computing environments to provide a multi-tenant software-as-a-service solution for storing and enabling access to historical data, such as time-series data for example, relating to continuous processes and their associated outputs. When the historical data is displayed on a display device (e.g., as a line chart, etc.), the data values at a particular time may visually differ from the data values at other times. For example, the visual difference may be a spike, a rate, and the like. Understanding the specific reasons for the value differences helps optimize operation of the continuous process. For example, the reason may be an event such as line downtime, a production status change, a product change, a crew change, and the like. Conventional techniques prepend a historian name to process tags that represent the data values and stamp events with a globally unique identifier (GUID) of the event data source. These techniques enable searching for tags and events but fail to provide any linkage between changes in process data values and the associated events responsible for the changes.

SUMMARY

Aspects of the present disclosure provide automated correlation of process attribute value changes with events responsible for the changes. A managed historian utilizes a namespace property to correlate the process tag values with corresponding events. The managed historian also generates a graphical user interface for remote display devices that includes a plot of data values of the process tag and a visual icon representing the events overlaid atop the plot of data values. Advantageously, aspects of the present disclosure enable users to clearly visualize events that are responsible for changes in process attribute values.

In an aspect, a system includes an application server and a managed historian. The application server has a name property that identifies it and stores at least one process tag and at least one event. The process tag represents an attribute of a continuous process. Exemplary and non-limiting attributes include physical properties of valves, sensors, pumps, tanks, and the like within the continuous process. The event represents a change in the attribute of the continuous process represented by the process tag. The process tag and the event each include a namespace property that inherits the name property of the application server. The managed historian includes at least one historian processor and at least one computer-readable storage medium communicatively coupled to the historian processor and storing processor-executable instructions. The historian processor is communicatively coupled, via a communications network, to the application server. The computer-readable storage medium stores processor-executable instructions that, when executed by the historian processor, configure the managed historian to perform a process for correlating the event and the process tag. The executing instructions configure the managed historian to receive the process tag and event from the application server, parse the process tag for its namespace property, and create a fully qualified tagname for the process tag. The fully qualified tagname includes the namespace property of the process tag. The executing instructions further configure the managed historian to correlate the process tag with the event based on the namespace property of the fully qualified tagname of the process tag matching the namespace property of the event.

In other aspects, a computer implemented method and a computer readable storage device are provided.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
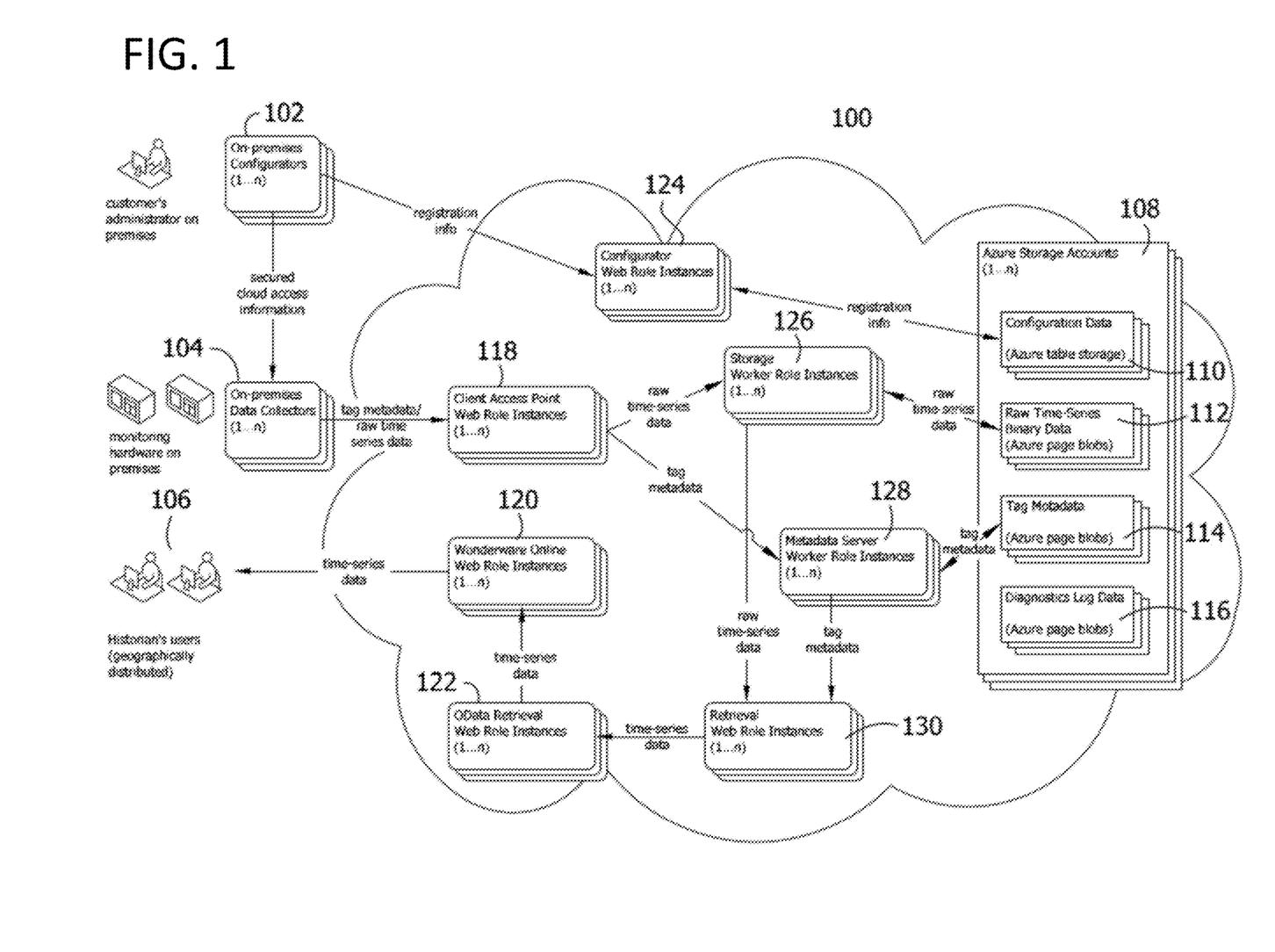
FIGS. 1 and 2 each illustrate aspects of an architecture of an exemplary historian system according to an embodiment.

Referring to FIG. 1, a distributed historian system, generally indicated at 100, is configured to store time-series data in a managed historian and enable users to access the data, even if the data is stored in different data sources. The historian system 100 is configured to store and use data from various locations and facilities and use cloud storage technology (e.g., a cloud computing service) to ensure that all the facilities are connected to all the necessary data. The system 100 forms connections with configurators 102, data collectors 104, and user computing devices 106 on which the historian data can be accessed. The configurators 102 are computer-executable modules that may be used by system administrators to configure the functionality of the historian system 100. The data collectors 104 are computer-executable modules that connect to and monitor hardware in the process control system to which the historian system 100 is connected. The data collectors 104 and configurators 102 may be at different locations throughout the process control system. The user computing devices 106 comprise computing devices that are geographically distributed, enabling historian data from the system 100 to be accessed from various locations across a country or throughout the world.

In an embodiment, historian system 100 stores a variety of types of data in storage accounts 108. This information includes configuration data 110, raw time-series binary data 112, tag metadata 114, and diagnostic log data 116. In an embodiment, raw time-series binary data comprises a tag that includes a value of a property within the continuous process at a particular time. In accordance with an embodiment of the disclosure, historian system 100 is further configured to store events and alarms in storage accounts 108. The storage accounts 108 may be organized to use table storage or other configuration, such as page blobs. Aspects of the present disclosure provide automated correlation of events and alarms to the corresponding raw time-series binary data 112 (e.g., process tags). As described below, a managed historian correlates event and alarm data with corresponding process data and generates a graphical user interface including event and alarm icons visually overlaid atop a plot of the process data.

The historian system 100 implements one or more execution roles, such as instances of web roles and/or instances of worker roles. A web role is a cloud execution service configured to execute web applications that are supported by Internet Information Services (IIS). A worker role is a cloud execution service configured to execute applications and service-level tasks, which generally do not require IIS support. In an embodiment, historian system 100 is accessed via web role instances. As shown, configurators 102 access configurator web role instances 124. And data collectors 104 access client access point web role instances 118. Online web role instances 120 are accessed by the user computing devices 106. The configurators 102 share configuration data and registration information with the configurator web role instances 124. The configuration data and registration information is stored in the storage accounts 108 as configuration data 110. The data collectors 104 share tag metadata and raw time-series data with the client access point web role instances 118. The raw time-series data is shared with storage worker role instances 126 and then stored as raw time-series binary data 112 in the storage accounts 108. The tag metadata is shared with metadata server worker role instances 128 and stored as tag metadata 114 in the storage accounts 108. The storage worker role instances 126 and metadata server worker role instances 128 send raw time-series data and tag metadata to retrieval worker role instances 130. The raw time-series data and tag metadata is converted into time-series data and sent to the online web role instances 120 via data retrieval web role instances 122. Users using the user computing devices 106 receive the time-series data from the online web role instances 120.

Figure 2:
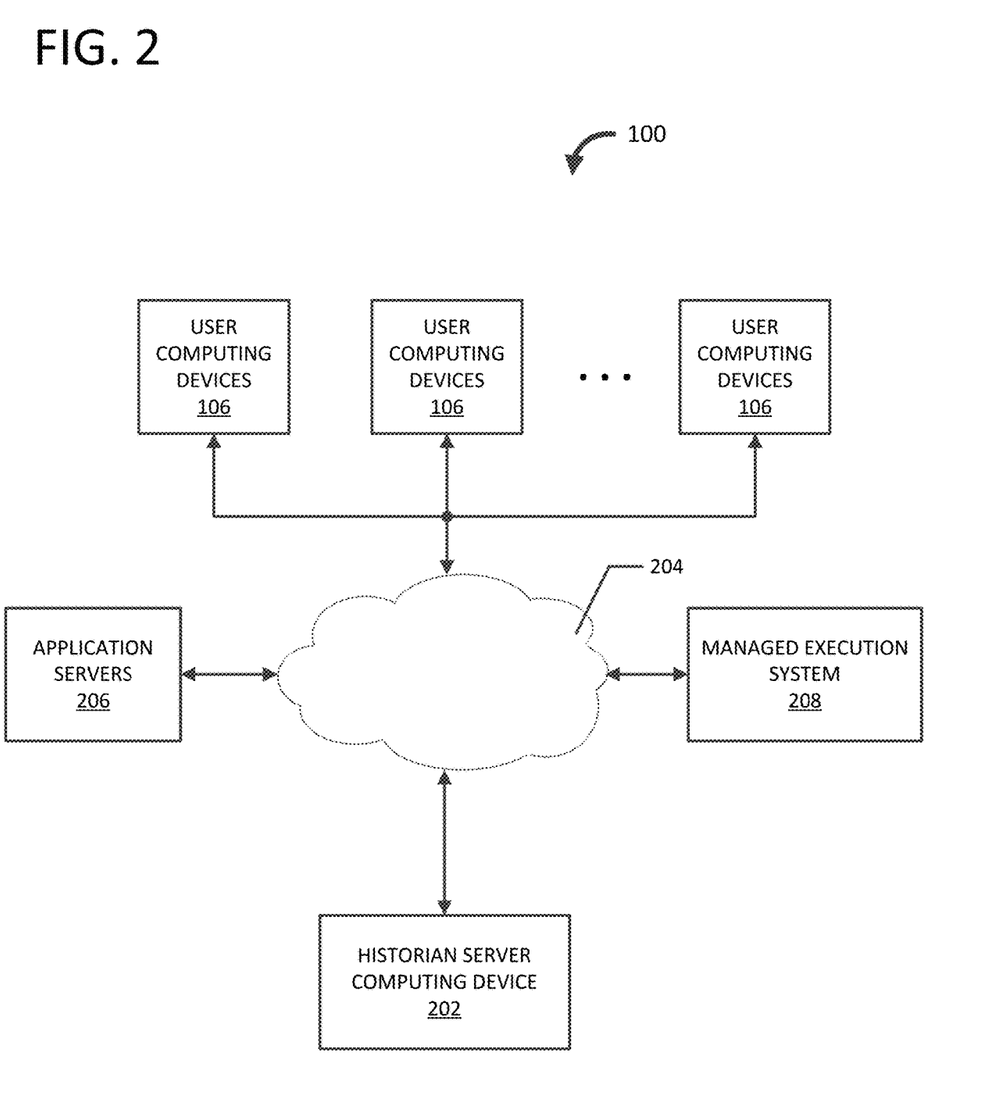

FIG. 2 illustrates aspects of historian system 100 from a slightly different perspective. As illustrated in FIG. 2, one or more user computing devices 106 are communicatively coupled to a historian server computing device 202 via a communications network 204. Although illustrated in FIG. 2 as a single device, one of ordinary skill in the art will understand that historian server computing device 202 may comprise one or more server computing devices communicatively coupled and forming a cloud computing environment, such as Microsoft Azure for example. In an embodiment, the storage accounts 108 and data therein are stored on computer-readable storage devices (e.g., memory) of historian server computing device 202 and the web role instances (e.g., client access point web role instances 118, online web role instances 120, data retrieval web role instances 122, configurator web role instances 124, storage worker role instances 126, metadata server worker role instances 128, retrieval worker role instances 130, etc.) execute on a processor of historian server computing device 202. The historian server computing device 202 is further communicatively coupled to one or more application servers 206 and a managed execution system (MES) 208 via the communication network 204.

The user computing devices 106 are configured to receive and display data stored on historian server computing device 202. Exemplary user computing devices include, but are not limited to, tablet computing devices, smartphones, laptop computing devices, desktop computing devices, workstations, and the like. The MES 208 is configured to execute in real-time to control one or more manufacturing systems, capture real-time data from the manufacturing systems, analyze patterns in the data for decision-making, quality control, report generation, and the like. In an embodiment, MES 208 utilizes a data source named $MES. When MES 208 registers process equipment, the equipment supplies the equipment name and namespace name (i.e., the namespace does not need to pre-exist). The namespace and source tag fields are utilized to link (e.g., correlate) event attributes references to process tags as further described herein.

The communications network 204 is capable of facilitating the exchange of data among various components of historian system 100, including user computing devices 106 and historian server computing devices 202. The communications network 204 in the embodiment of FIG. 2 includes a wide area network (WAN) and/or a local area network (LAN) that is connectable to other telecommunications networks, including other WANs, LANs, and/or portions of the Internet or an intranet. The communications network 204 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications network 204 is any medium that allows data to be physically transferred through serial or parallel communication channels (e.g., copper wire, optical fiber, computer bus, wireless communication channel, etc.). In an embodiment, communications network 204 comprises at least in part a process control network. In another embodiment, communications network 204 comprises at least in part a supervisory control and data acquisition (SCADA) system. In yet another embodiment, communications network 204 comprises at least in part an enterprise manufacturing intelligence (EMI)/operational intelligence (01) system.

Figure 3:
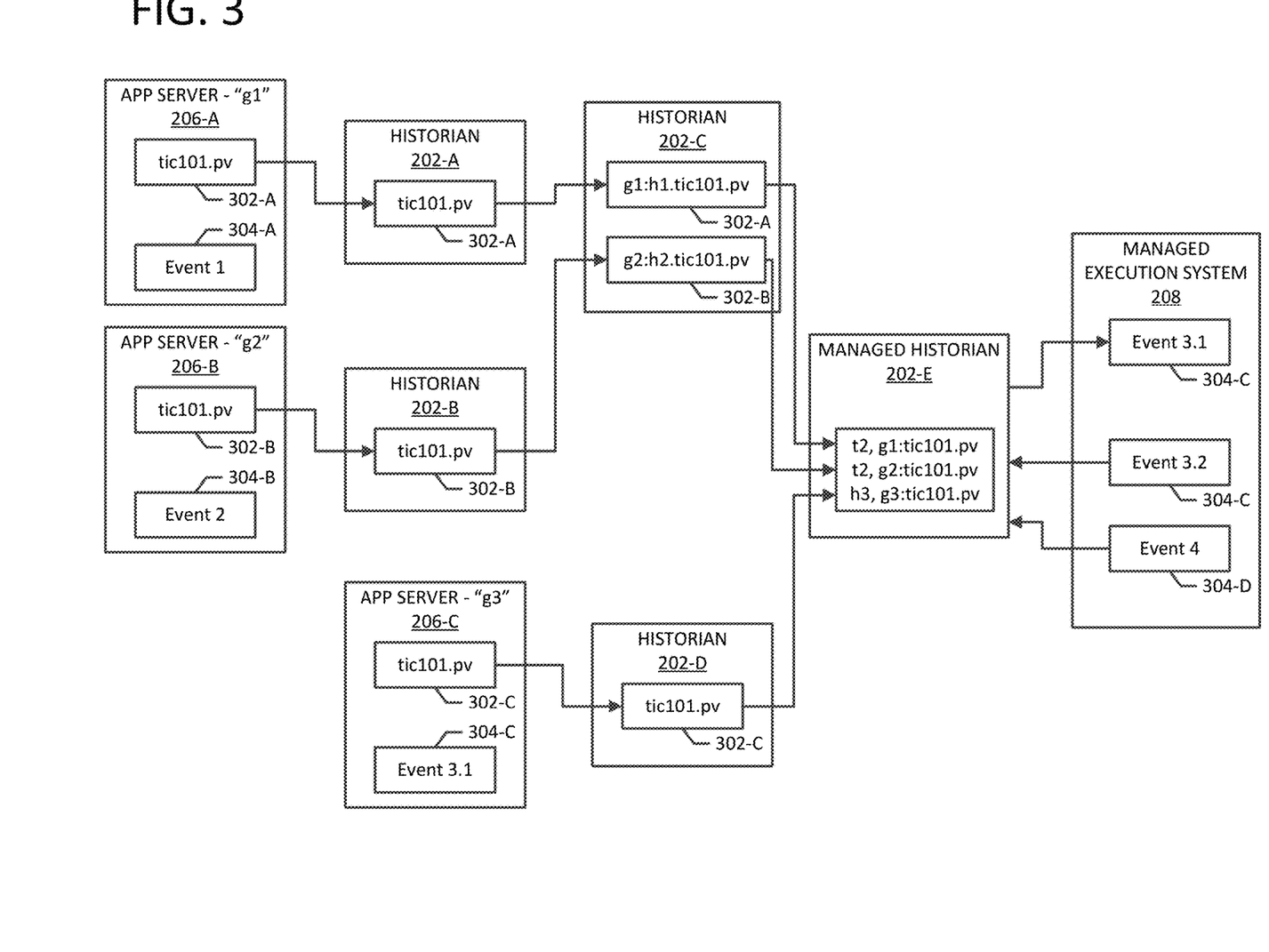
FIG. 3 illustrates an exemplary automated event correlation process performed by the historian systems of FIGS. 1 and 2.

FIG. 3 illustrates an exemplary automated event correlation process performed by historian system 100. The application servers 206 store process tags and events and have a name property that identifies the application server. For example, application server 206-A has a name property of "g1", application server 206-B has a name property of "g2", and application server 206-C has a name property of "g3". In an embodiment, the name property of application servers 206 defaults to the data source name. In accordance with an aspect of the present disclosure, application servers 206 comprise a data source. Although embodiments described herein utilize application servers 206, one of ordinary skill in the art will understand that other data sources are within the scope of the present disclosure. Exemplary data sources include, but are not limited to, a custom data source that sends both process data and event data and can correlate them during visualization, replication servers, Internet of Things (IoT) devices, custom software development kit (SDK) applications, and the like. In another embodiment, the name property of application servers 206 is configured to be edited by a user. The application servers 206 store process tags in a {namespace}:{attribute_reference} syntax in accordance with an embodiment of the disclosure. For example, application server 206-A stores process tag 302-A as g1:tic101.pv. When local to application server 206-A, the name tic101.pv is used and displayed. By default, process tags 302 and events 304 inherit the namespace property of their respective data sources. The default namespace property of individual process tags 302 can be overridden by setting a value (e.g., value set by a user and/or system 100) in the namespace extended property of the process tag. For example, the value may be the name of the galaxy. Individual events 304 can specify a namespace by setting a value (e.g., value set by a user and/or system 100) in the namespace extended property of the event. In an embodiment, events 304 comprise alarms (e.g., Alarm Ack). The events 304 include a namespace property that defaults to the data source name if the user and/or system 100 does not specify a property value.

As illustrated in FIG. 3, the managed historian 202-E receives process tag 302-A and event 304-A from application server 206-A. In an embodiment, historians 202-A, 202-B, 202-C, and 202-D and managed historian 202-E comprise historian server computing device 202, historians 202-A and 202-B are Tier 1 historians, and historian 202-C is a Tier 2 historian. The managed historian 202-E parses the received process tag 302-A for its namespace property. In an embodiment in which application server 206-A uploads process tag 302-A without a specific namespace (e.g., comma-separated value (CSV), etc.) but includes a colon (i.e., ":") in the tag name (e.g., g1:tic101.pv, etc.), managed historian 202-E parses the tag name and automatically sets the namespace property of process tag 302-A to the source name (e.g., "g1", etc.). The managed historian 202-E then creates a fully qualified tag name (FQN) for process tag 302-A that includes the namespace property of the process tag. In an embodiment, a tag name is fully qualified when it includes all names in the hierarchic sequence above the current element and the name of the current element itself. An exemplary fully qualified tag name in accordance with an aspect of the disclosure is in a namespace:tagname syntax. In an embodiment, a replication prefix is used to create fully qualified tag names in managed historian 202-E. Tag references that are not fully qualified, for example those from an event, are augmented with the namespace of the referring event. In an embodiment, an ODATA function (e.g., make_fqn(reference_string, default_namespace)) creates a fully qualified tag name from a namespace and an attribute reference. When managed historian 202-E receives a process tag 302 created with a fully qualified tag name, it checks to determine if the process tag already exists (e.g., in a custom repository in binary encrypted form, etc.) and accepts or rejects the process tag depending on data source rules (e.g., allow overwriting). In an embodiment, if the process tag already exists the prior tag will be stored as a version and the newly created tag becomes the active version of the process tag. After creating a fully qualified name for the process tag 302-A, managed historian 202-E correlates the process tag 302-A with event 304-A based on the namespace property of the fully qualified tag name of the process tag matching the namespace property of the event.

In an embodiment, MES 208 updates events 304. For example, MES 208 may change the reason code for a stop event. As illustrated in FIG. 3, MES 208 reads event 304-C at a first time (e.g., "Event 3.1"). A user updates the event and MES 208 saves it back to the managed historian 202-E at a second time (e.g., "Event 3.2"). Throughout the event updating process, the namespace of event 304-C is "g3" and this namespace is used to link event 304-C with corresponding process tag 302-C. In another embodiment, a new event 304-D is added by MES 208. For example, event 304-D may represent a shift change event and does not belong to a namespace. In this embodiment, a namespace is not required. For example, if the namespace is not specified then the source name becomes the namespace value.

Figure 4:
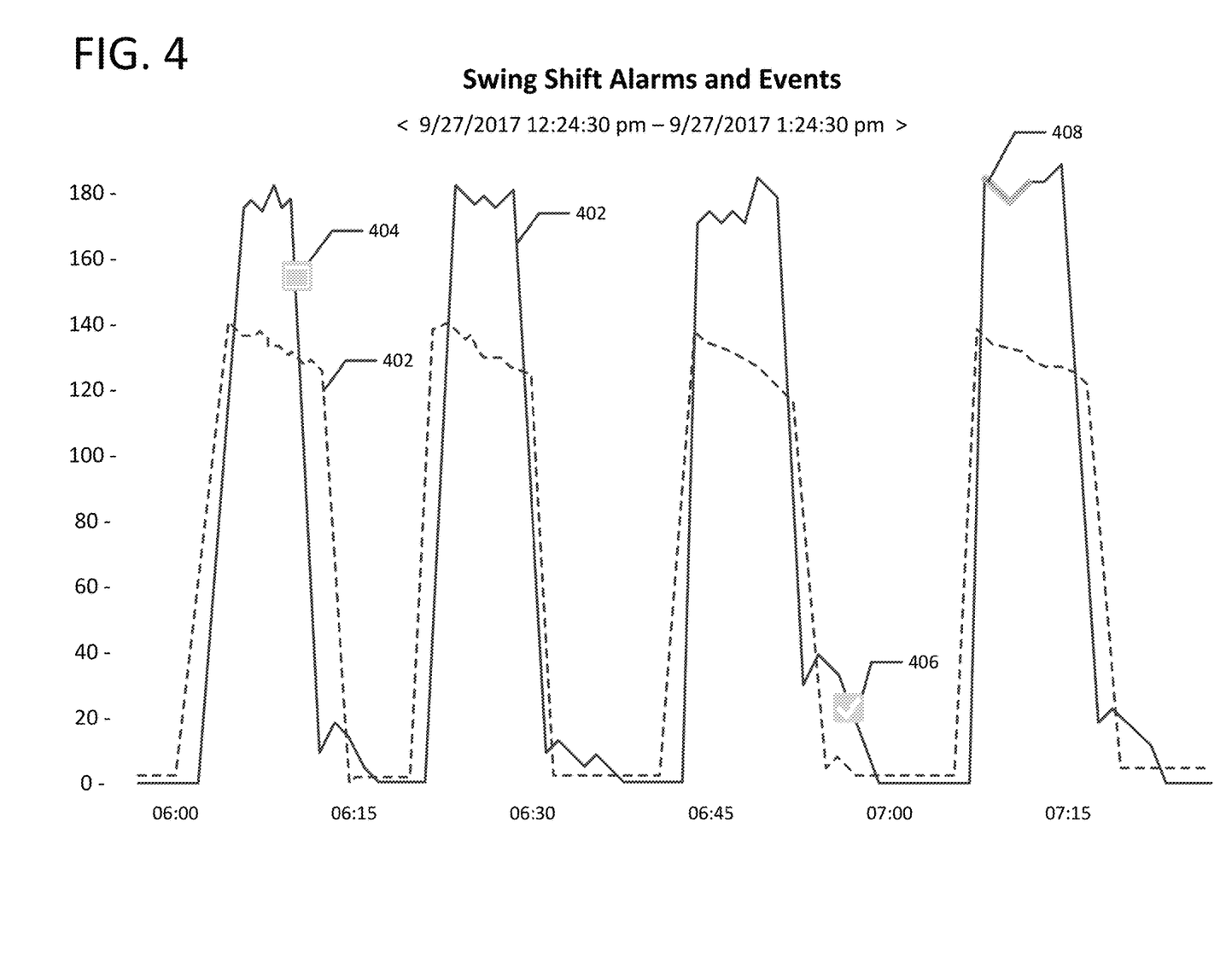
FIGS. 4 and 5 are each diagrams illustrating exemplary graphical user interfaces of the historian systems of FIGS. 1 and 2.

FIG. 4 illustrates an exemplary GUI including event icons 404 representing events 304 and alarm icons 406 overlaid atop a plot 402 of data values of process tags 302. The plot 402 illustrated in FIG. 4 visually depicts the data values of process tags 302 using a line chart that plots the process data over time. In an embodiment, the GUI illustrated in FIG. 4 is displayed by one or more user computing devices 106. By overlaying the event icons 404 and alarm icons 406 atop the plot 402, aspects of the present disclosure provide highly contextualized, co-related, and precise superimposition of curated event icons over the process data plot. In an embodiment, the ability to visually overlay event icons 404 and alarm icons 406 atop the plot 402 is enabled by the correlation of process tags 302 and events 304 through the namespace property as further described herein. The overlaid event icons 404 and alarm icons 406 enable a user to visualize and understand the event 304 that is responsible for a change in value of the process tag 302.

The GUI may include an alarm state indicator that is displayed as a highlighted line beginning with an alarm setting event (e.g., Alarm.Set) and ending with an alarm clearing (e.g., Alarm.Clear) event. When either the alarm setting event or the alarm clearing event occurs outside the timeframe of values displayed on the GUI the highlighted area of the alarm state indicator is still displayed. When both the alarm setting event and the alarm clearing event for the same alarm occur outside the timeframe of values displayed on the GUI the highlighted area of the alarm state indicator is not displayed. The GUI may further include an alarm acknowledge event icon (e.g., alarm icon 406) that marks the point in time when an alarm is acknowledged. The GUI may also include an application write event icon (e.g., event icon 404) that marks the point in time when the application records an event (e.g., event 304). Further icons of the GUI include, but are not limited to, a user write event marking the particular time when a user records an event, a user write secured icon marking the particular time when a user writes a secured event, and a user write verified icon marking the particular time when a user writes a verified event. In an embodiment, events 304 that are correlated are automatically paired together and displayed in the GUI as a contiguous highlighted area 408 over the process data plot 402.

Figure 5:
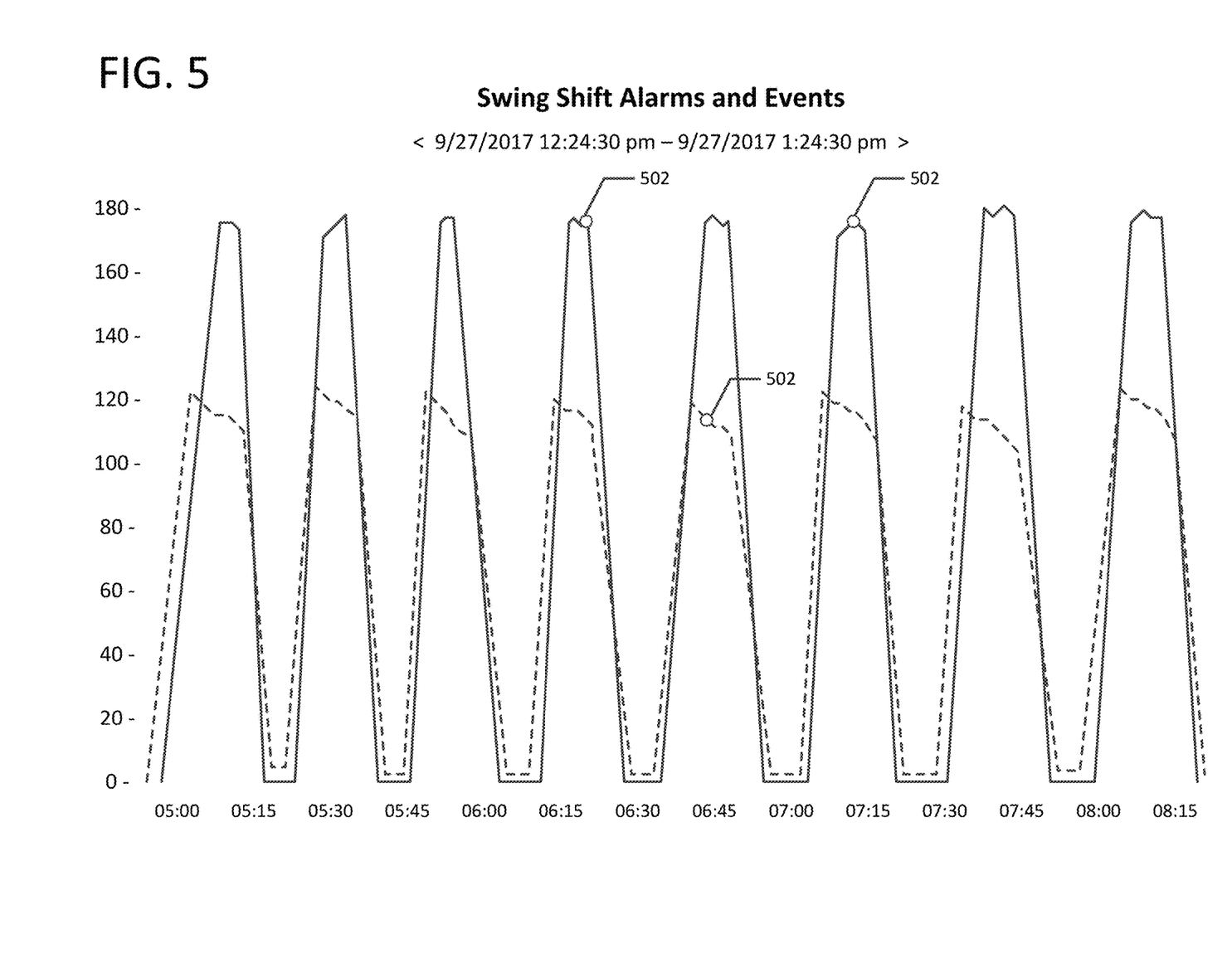

As illustrated by FIG. 5, the GUI displays a multiple events icon 502 to reduce clutter when there are too many event icons to display neatly for the presented timeframe. In an embodiment, the multiple events icon 502 is displayed for any tag that has more than thirty events in the displayed timeframe. In this manner, the level of detail displayed for the events is automatically controlled based on the zoom level so that users can visualize many events at a higher level corresponding to a broader period of time (e.g., FIG. 5) and be able to view details of fewer events at a lower level corresponding to a specific time interval by zooming in (e.g., FIG. 4). The GUI is configured for zooming in on both the Y-axis (e.g., process value axis) and X-axis (e.g., time axis), which enables users to easily visualize trends over time in the process data of interest and zoom into details for a specific time period. In an embodiment, the GUI illustrated in FIG. 5 is displayed by one or more user computing devices 106.

Figure 6:
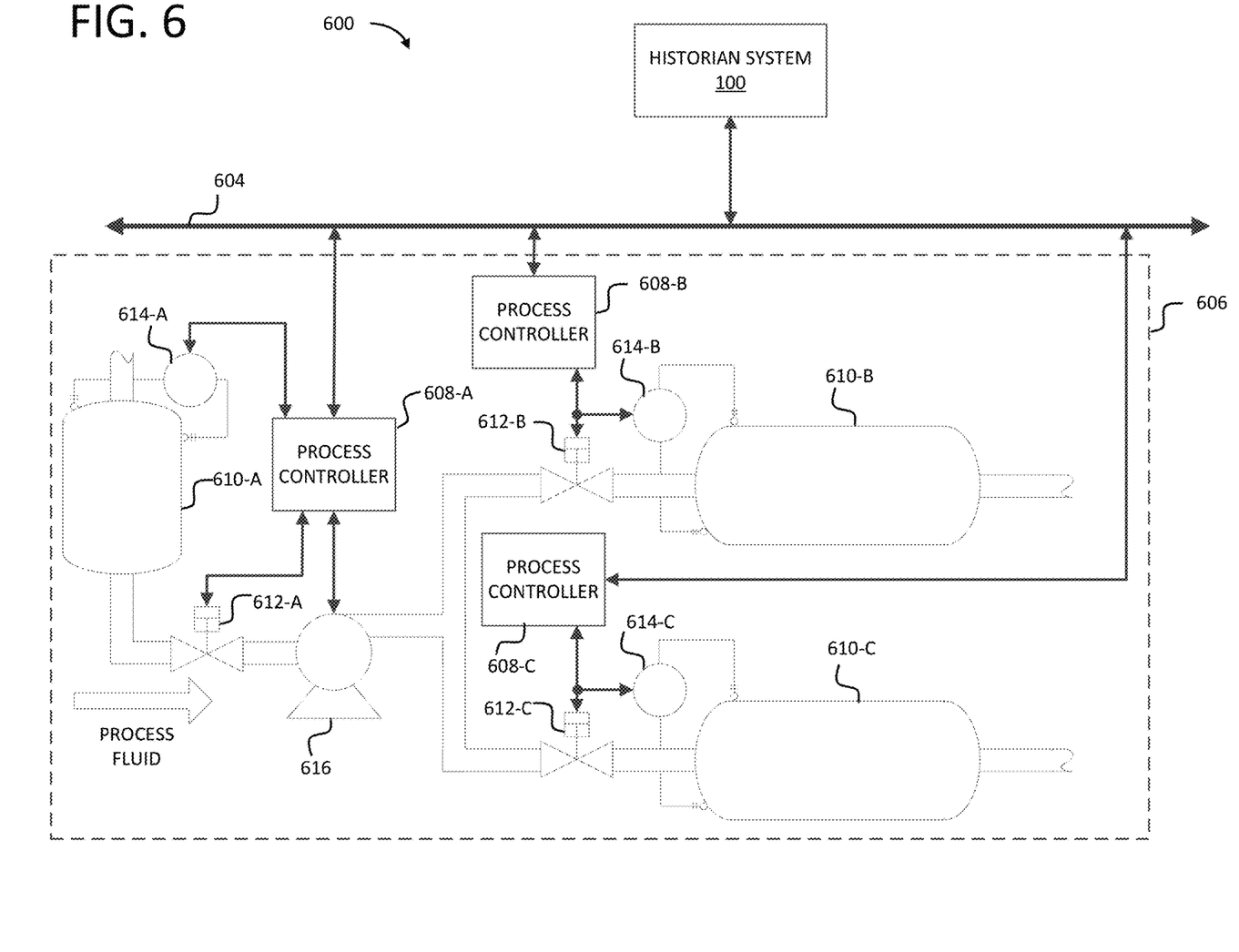
FIG. 6 illustrates an exemplary industrial process system within which aspects of the disclosure are incorporated according to an embodiment.

FIG. 6 illustrates an exemplary system, generally indicated at 600, within which an embodiment of the disclosure may be incorporated. The system 600 includes the historian system 100, a communications infrastructure 604, and an exemplary plant, such as a fluid processing system 606. As illustrated, the fluid processing system 606 includes process controllers 608, tanks 610, valves 612, sensors 614, and a pump 616. In an embodiment, the historian system 100, the communications infrastructure 604, the process controllers 608, and the sensors 614 comprise at least in part a process control network, a SCADA system, and/or an EMI/OI system. In system 600, historian system 100, process controllers 608, the tanks 610, the valves 612, sensors 614, and the pump 616 are communicatively coupled via communications infrastructure 604.

The communications infrastructure 604 is capable of facilitating the exchange of data among various components of system 600, including historian system 100 and components of fluid processing system 606 (e.g., process controllers 608, valves 612, sensors 614, etc.). In an embodiment, communications infrastructure 604 comprises communications network 204. The communications infrastructure 604 in the embodiment of FIG. 6 includes a local area network (LAN) that is connectable to other telecommunications networks, including other LANs or portions of the Internet or an intranet. The communications infrastructure 604 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications infrastructure 604 is any medium that allows data to be physically transferred through serial or parallel communication channels (e.g., copper wire, optical fiber, computer bus, wireless communication channel, etc.).

Still referring to FIG. 6, the fluid processing system 606 is adapted for changing or refining raw materials to create end products. It will be apparent to one skilled in the art that aspects of the present disclosure are capable of optimizing processes and processing systems other than fluid processing system 606 and that system 606 is presented for illustration purposes only. Additional exemplary processes include, but are not limited to, those in the chemical, oil and gas, food and beverage, pharmaceutical, water treatment, and electrical power industries. For example, processes may include conveyers, power distribution systems, and/or processes or operations that cannot be interrupted. In an embodiment, process controllers 608 provide an interface or gateway between components of fluid processing system 606 (e.g., valves 612, sensors 614, pump 616) and other components of system 600. In another embodiment, components of fluid processing system 606 communicate directly with system and process 100 via communications infrastructure 204. In yet another embodiment, process controllers 608 transmit data to and receive data from historian system 100, valves 612, sensors 614, and/or pump 616 for controlling and/or monitoring various aspects of fluid processing system 606. The processor controllers 608 and/or sensors 614 comprise the data collectors 104 in accordance with one or more aspects of the present disclosure.

The process controllers 608 of FIG. 6 are adapted to control and/or monitor aspects of fluid processing system 606. In an embodiment, processor controllers 608 are programmable logic controllers (PLC) that control and collect data from aspects of fluid processing system 606. In another embodiment, process controllers 608 are adapted to execute real-time applications that receive configuration data values and real-time data values from historian system 100 and transmit real-time data values (e.g., time-series data values) to historian system 100, as further described herein.

Figure 7:
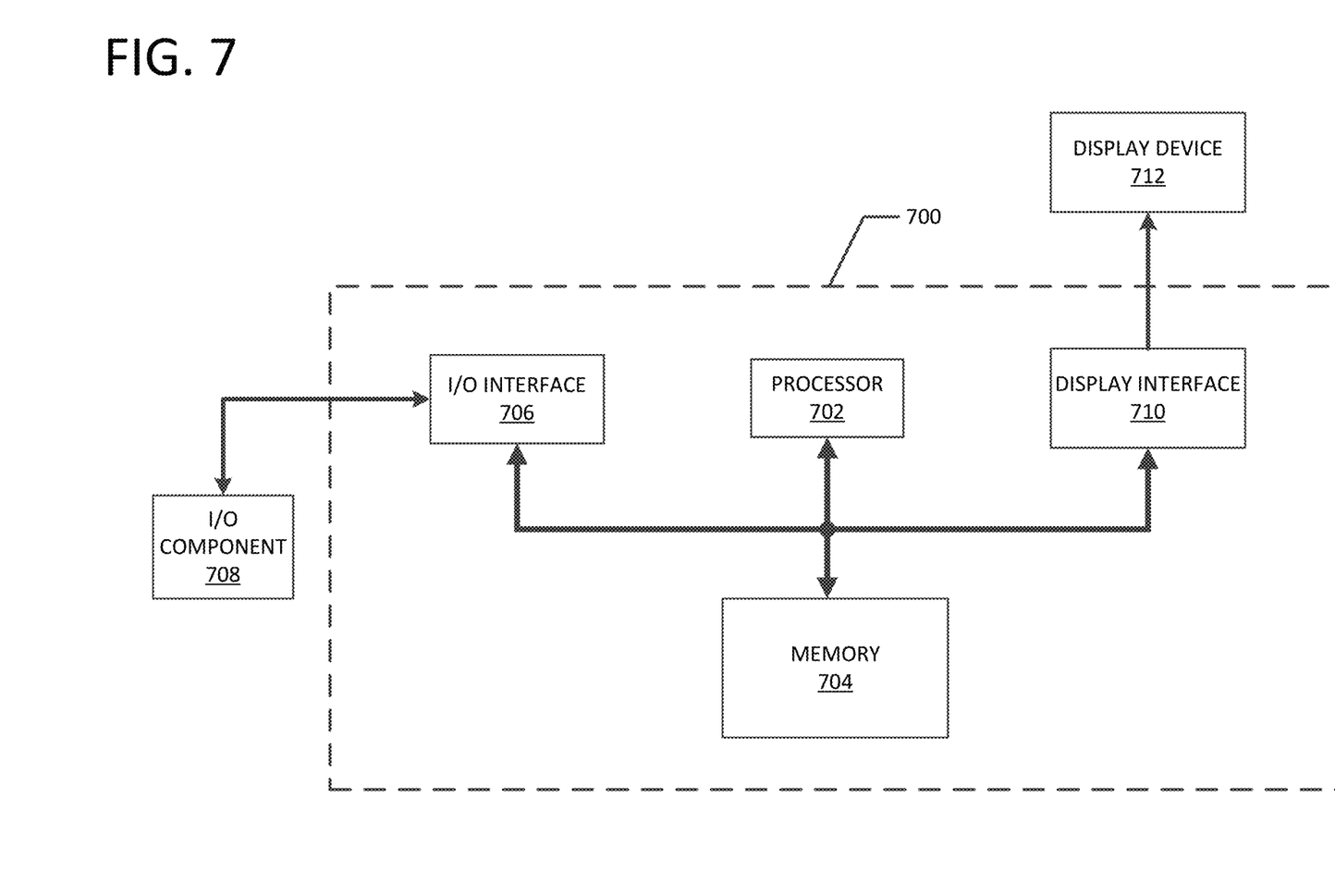
FIG. 7 is a block diagram of an exemplary computing device architecture within which aspects of the disclosure are implemented according to an embodiment.

FIG. 7 illustrates an exemplary architecture of a computing device 700 (e.g., user computing devices 106, historian server computing device 202, etc.) programmed to provide aspects of the systems and processes described herein via a software environment. In this embodiment, the computing device 700 includes a processor 702, a memory 704, an input/output (I/O) interface 706 that interfaces with an I/O component 708, and display interface 710. In an embodiment, the memory 704 includes storage accounts 108 and the applications and data (e.g., alarms, events, process tags, etc.) each embodied in processor-executable instructions for executing by processor 702. In this manner, the computing device 700 comprises a special-purpose computing device for automatically correlating process attribute value changes with events responsible for the changes in a managed historian of historian system 100 in accordance with an aspect of the disclosure.

The processor 702, memory 704, I/O interface 706, and display interface 710 are communicatively connected and/or electrically connected to each other. The I/O interface 706 is communicatively and/or electrically connected to the I/O component 708. The processor 702 is adapted to execute processor-executable instructions stored in the memory 704 for automatically correlating process attribute value changes with events responsible for the changes and generating a graphical user interface including event and alarm icons visually overlaid atop a plot of the process data. The I/O interface 706 of FIG. 7 provides a physical data connection between the computing device 700 and I/O component 708. In an embodiment, I/O interface 706 is a network interface card (NIC) or modem and I/O component 708 is a telecommunications network (e.g., communications network 204). The display interface 710 provides a physical data connection between computing device 700 and a display device 712. In an embodiment, display device 712 is a touchscreen of a smartphone, tablet computing device, or the like.

In an aspect, a system includes an application server (e.g., application server 206) and a managed historian (e.g., historian server computing device 202). The application server has a name property that identifies it and stores at least one process tag (e.g., process tags 302) and at least one event (e.g., events 304). The process tag represents an attribute of a continuous process (e.g., fluid processing system 606). Exemplary and non-limiting attributes include physical properties of valves, sensors, pumps, tanks, and the like within the continuous process. The event represents a change in the attribute of the continuous process represented by the process tag. The process tag and the event each include a namespace property that inherits the name property of the application server. The managed historian includes at least one historian processor (e.g., processor 702) and at least one computer-readable storage medium (e.g., memory 704) communicatively coupled to the historian processor and storing processor-executable instructions. The historian processor is communicatively coupled, via a communications network (e.g., communications network 204), to the application server. The computer-readable storage medium stores processor-executable instructions that, when executed by the historian processor, configure the managed historian to perform a process for correlating the event and the process tag. The executing instructions configure the managed historian to receive the process tag and event from the application server, parse the process tag for its namespace property, and create a fully qualified tagname for the process tag. The fully qualified tagname includes the namespace property of the process tag. The executing instructions further configure the managed historian to correlate the process tag with the event based on the namespace property of the fully qualified tagname of the process tag matching the namespace property of the event.

In one form, the system further comprises a manufacturing execution system (e.g., MES 208) configured to read the event from the managed historian, update the event, and return the updated event back to the managed historian. The updated event includes the same namespace property as the read event.

In another form, the executing instructions further configure the managed historian to receive the event from the application server, update the event with the namespace property of the correlated process tag and the name property of the application server, and store the updated event on the computer-readable storage medium.

In another form, the system further comprises a remote display device (e.g., user computing devices 106) that is communicatively coupled to the historian processor via the communications network. The managed historian is further configured to provide the correlated process tag and event to the remote display device.

In yet another form, the remote display device is configured to generate and display a GUI that includes a plot of data values (e.g., process data plot 402) of the attribute of the continuous process represented by the process tag and a visual indication (e.g., event icons 404) of the event overlaid atop the plot of data values. In another form, a detail level of the visual indication of the event is based on a zoom level of the plot of data values on the GUI. In yet another form, a detail level of the visual indication of the event is based on a density of the event and one or more other events on the GUI. In another form, the event is automatically paired with one or more other events based on the namespace properties of the event and the one or more other events matching. In this form, the paired events are displayed as a contiguous highlighted area (e.g., contiguous highlighted area 408) atop the plot of data values on the GUI.

In another aspect, the present disclosure provides a computer-implemented method of automatically correlating process attribute value changes with events responsible for the changes in a managed historian of a distributed historian system. The method includes receiving a process tag from an application server. The application server has a name property that identifies it and the application server stores an event. The process tag represents an attribute of a continuous process and the event represents a change in the attribute of the continuous process represented by the process tag. Moreover, the process tag and the event each include a namespace property that inherits the name property of the application server. The method further includes parsing the received process tag for its namespace property and creating a fully qualified tagname for the process tag. The fully qualified tagname includes the namespace property. And the method includes correlating the process tag with the event based on the namespace property of the fully qualified tagname of the process tag matching the namespace property of the event.

In yet another aspect, a computer readable storage device (e.g., memory 704) stores processor readable instructions that, when executed by a processor (e.g., processor 702), implement a method of correlating process attribute value changes with events responsible for the changes in a managed historian of a distributed historian system. The method includes receiving a process tag from an application server. The application server has a name property that identifies it and the application server stores an event. The process tag represents an attribute of a continuous process and the event represents a change in the attribute of the continuous process represented by the process tag. Moreover, the process tag and the event each include a namespace property that inherits the name property of the application server. The method further includes parsing the received process tag for its namespace property and creating a fully qualified tagname for the process tag. The fully qualified tagname includes the namespace property. And the method includes correlating the process tag with the event based on the namespace property of the fully qualified tagname of the process tag matching the namespace property of the event. The managed historian provides the correlated process tag and event to a remote display device communicatively coupled to the managed historian via a communications network. The method further includes generating and displaying a GUI on the remote display device that includes a plot of data values of the attribute of the continuous process represented by the process tag and an event icon representing the event. The event icon is overlaid atop the plot of data values on the GUI.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system, comprising:
    an application server, the application server having a name property, and the application server storing at least one process tag and at least one event, wherein the at least one process tag represents an attribute of a process, wherein the at least one event represents a change in the attribute of the process represented by the at least one process tag, and wherein the at least one process tag and the at least one event each include a namespace property that inherits the name property of the application server; and
    a managed historian, comprising:
        a historian processor, the historian processor communicatively coupled to the application server; and
        a computer-readable storage medium communicatively coupled to the historian processor and storing one or more processor-executable instructions, said processor-executable instructions, when executed by the historian processor, configure the managed historian to:
            receive the at least one process tag and the at least one event from the application server,
            parse the received process tag for the namespace property thereof,
            create a tagname for the process tag, the tagname including the namespace property thereof, and
            correlate the process tag with the event based on the namespace property of the tagname of the process tag matching the namespace property of the event.

2. The system of claim 1, wherein the processor-executable instructions, when executed by the historian processor, further configure the managed historian to:
    receive the at least one event from the application server,
    update the event with the namespace property of the process tag correlated therewith and the name property of the application server, and
    store the updated event on the computer-readable storage medium.

3. The system of claim 1, further comprising a remote display device, wherein the historian processor is communicatively coupled to the remote display device, and wherein the managed historian is further configured to provide the correlated process tag and event to the remote display device.

4. The system of claim 3, wherein the remote display device is configured to generate and display a graphical user interface (GUI), the GUI including a plot of data values of the at least one attribute of the process represented by the process tag and a visual indication of the event overlaid atop the plot of data values.

5. The system of claim 4, wherein a detail level of the visual indication of the event is based on a zoom level of the plot of data values on the GUI.

6. The system of claim 4, wherein a detail level of the visual indication of the event is based on a density of the event and one or more other events on the GUI.

7. The system of claim 4, wherein the event is automatically paired with one or more other events based on the namespace property of the event and the one or more other events matching, and wherein the paired events are displayed as a contiguous highlighted area atop the plot of data values on the GUI.

8. A computer-implemented method of automatically correlating process attribute value changes with events responsible for the changes in a managed historian of a distributed historian system, the method comprising:
    receiving a process tag from an application server, the application server having a name property, the application server storing an event, the process tag representing an attribute of a process, the event representing a change in the attribute of the process represented by the process tag, and the process tag and the event each including a namespace property that inherits the name property of the application server;
    parsing the received process tag for the namespace property thereof;
    creating a tagname for the process tag, the tagname including the namespace property; and
    correlating the process tag with the event based on the namespace property of the tagname of the process tag matching the namespace property of the event.

9. The method of claim 8, further comprising providing the event to a manufacturing execution system and receiving an updated event back from the manufacturing execution system, wherein the updated event includes the same namespace property as the provided event.

10. The method of claim 8, further comprising providing the correlated process tag and event to a remote display device communicatively coupled to the managed historian.

11. The method of claim 10, further comprising generating and displaying a graphical user interface (GUI) on the remote display device, the GUI including a plot of data values of the attribute of the process represented by the process tag and an event icon representing the event, wherein the event icon is overlaid atop the plot of data values.

12. The method of claim 11, wherein a detail level of the event icon is based on a zoom level of the plot of data values on the GUI.

13. The method of claim 11, wherein a detail level of the event icon is based on a density of the event and one or more other events on the GUI.

14. The method of claim 11, further comprising pairing the event with one or more other events based on the namespace property of the event matching the namespace property of the one or more other events, and displaying the paired events as a contiguous highlighted area atop the plot of data values on the GUI.

15. A computer readable storage device having processor readable instructions stored thereon including instructions that, when executed by a processor, implement a method of correlating process attribute value changes with events responsible for the changes in a managed historian of a distributed historian system, comprising:
    receiving a process tag from an application server, the application server having a name property, the application server storing an event, the process tag representing an attribute of a process, the event representing a change in the attribute of the process represented by the process tag, and the process tag and the event each including a namespace property that inherits the name property of the application server;
    parsing the received process tag for the namespace property thereof;
    creating a tagname for the process tag, the tagname including the namespace property;
    correlating the process tag with the event based on the namespace property of the tagname of the process tag matching the namespace property of the event;
    providing the correlated process tag and event to a remote display device communicatively coupled to the managed historian; and
    generating and displaying a graphical user interface (GUI) on the remote display device, the GUI including a plot of data values of the attribute of the process represented by the process tag and an event icon representing the event, wherein the event icon is overlaid atop the plot of data values.

16. The computer readable storage device of claim 15, further comprising providing the event to a manufacturing execution system and receiving an updated event back from the manufacturing execution system, wherein the updated event includes the same namespace property as the provided event.

17. The computer readable storage device of claim 15, wherein a detail level of the event icon is based on a zoom level of the plot of data values on the GUI.

18. The computer readable storage device of claim 15, wherein a detail level of the event icon is based on a density of the event and one or more other events on the GUI.

19. The computer readable storage device of claim 15, further comprising pairing the event with one or more other events based on the namespace property of the event matching the namespace property of the one or more other events, and displaying the paired events as a contiguous highlighted area atop the plot of data values on the GUI.

* * * * *